United States Patent
Wen et al.

(10) Patent No.: US 7,296,260 B2
(45) Date of Patent: Nov. 13, 2007

(54) SYSTEM AND METHOD FOR COMPOSING A MULTI-LINGUAL INSTRUCTIONAL SOFTWARE

(75) Inventors: Sayling Wen, Taipei (TW); Zechary Chang, Taipei (TW); Pinky Ma, Beijing (CN); Bing Bian, Beijing (CN)

(73) Assignee: Inventec Corporation, Taipei (TW)

( * ) Notice: Subject to any disclaimer, the term of this patent is extended or adjusted under 35 U.S.C. 154(b) by 798 days.

(21) Appl. No.: 10/372,825

(22) Filed: Feb. 26, 2003

(65) Prior Publication Data

US 2004/0168159 A1    Aug. 26, 2004

(51) Int. Cl.
*G06F 9/45*    (2006.01)
*G06F 9/44*    (2006.01)

(52) U.S. Cl. ............... 717/136; 717/140; 717/148; 717/162

(58) Field of Classification Search ............... 717/136, 717/140, 108, 162, 106, 148; 704/8
See application file for complete search history.

(56) References Cited

U.S. PATENT DOCUMENTS

| | | | | |
|---|---|---|---|---|
| 5,752,034 A | * | 5/1998 | Srivastava et al. | 717/130 |
| 6,077,085 A | * | 6/2000 | Parry et al. | 434/322 |
| 6,330,530 B1 | * | 12/2001 | Horiguchi et al. | 704/4 |
| 6,757,646 B2 | * | 6/2004 | Marchisio | 704/8 |

* cited by examiner

*Primary Examiner*—Meng-Al T. An
*Assistant Examiner*—Insun Kang
(74) *Attorney, Agent, or Firm*—Birch, Stewart, Kolasch & Birch, LLP

(57) ABSTRACT

A system and method for composing a multi-lingual instructional software is disclosed. The software includes interface components, lingual components and exercise banks to be linked and compiled dynamically upon user's requests of an original language and a target language, so that a plurality of combinations of lingual instructional materials can be obtained from a single software according to the user's requirements.

1 Claim, 4 Drawing Sheets

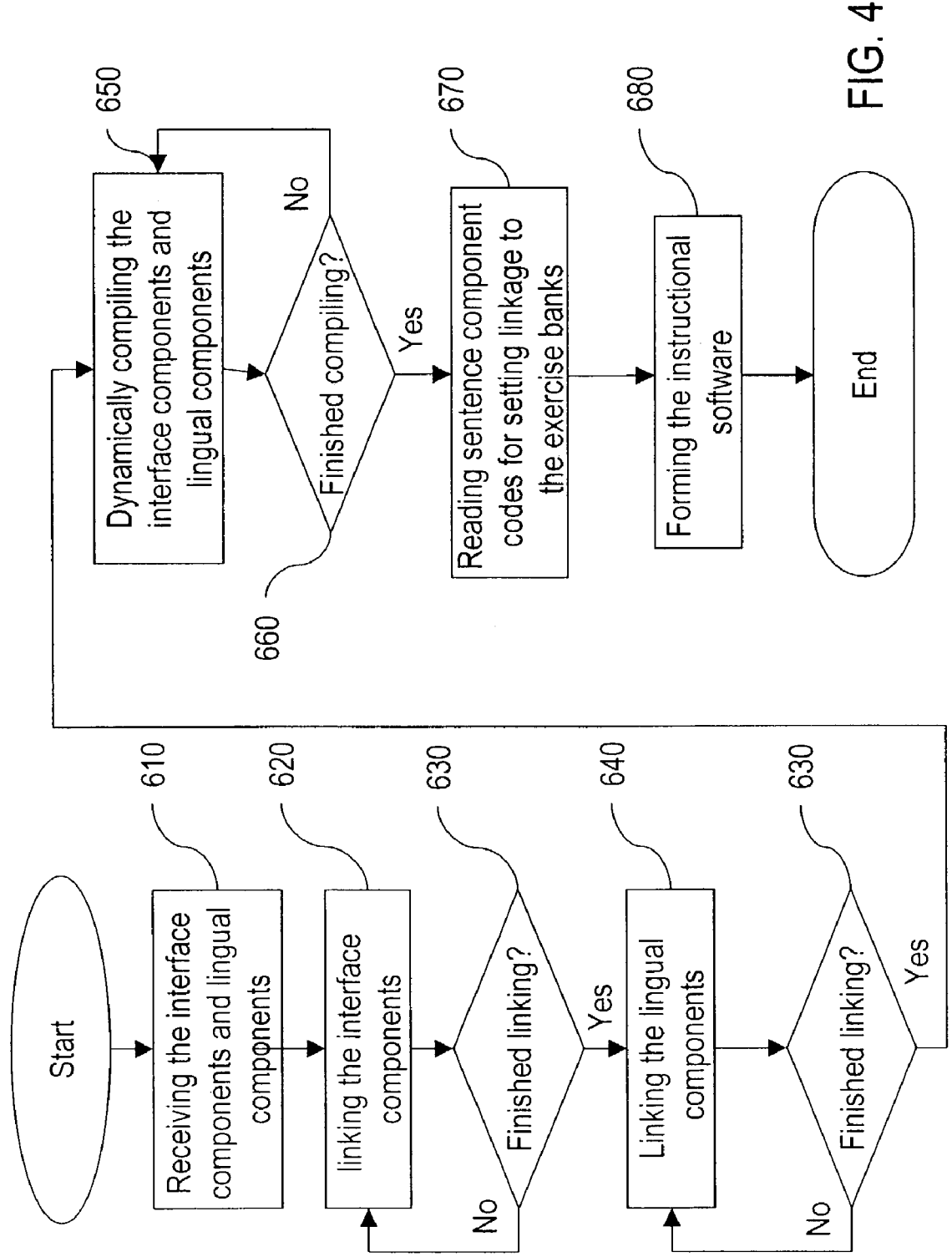

SYSTEM AND METHOD FOR COMPOSING A MULTI-LINGUAL INSTRUCTIONAL SOFTWARE

BACKGROUND OF THE INVENTION

1. Field of the Invention

The invention generally relates to system and method for composing an application software, and particularly relates to a system and method for composing a lingual instructional software in which any two languages designated as a source language and a target language are dynamically selected by user and automatically compiled from a plurality of language components so as to be a user-composed instructional software.

2. Related Art Compose

Conventional lingual instructional software is designed by software developer for specific languages. For example, for users familiar with Chinese, a Chinese/English instructional software, Chinese/Japanese instructional software, Chinese/French instructional software or the like has to be developed. For users familiar with English, then, an English/Chinese instructional software, English/Japanese instructional software, English/French instructional software or the like has to be developed. As a result, when a new lingual instructional software has to be developed for a specific language user, a great effort of developing manpower, time and expense has to be repeatedly applied, which is a great burden to a software developer.

Moreover, the conventional lingual instructional software designed for a single language cannot fulfill the requirements of modern diversified language learning of general users. Since people usually require learning of different languages, the lingual instructional software should be more versatile to meet the user's requirements.

It is possible to utilize computer software technology, lingual instructional software technology, and concepts of dynamic linkage and compiling of lingual components to achieve a dynamic composition of lingual instructional software. This user-composed software does not only save the efforts of developer for kinds of lingual instructional software, but also satisfies the user's needs when the user wants to learn more languages from a single application software.

SUMMARY OF THE INVENTION

The object of the invention is therefore to provide a system and method for composing a multi-lingual instructional software. The software includes user interface components, lingual components and exercise banks to be linked and compiled dynamically upon user's requests of an original language and a target language, so that a plurality of combinations of lingual instructional materials can be obtained from a single software according to user's requirements.

Another object of the invention is to provide a system and method for composing versatile lingual instructional software through which the software developer can save the efforts of developing different kinds of lingual instructional software.

A system for composing a multi-lingual instructional software according to the invention includes a parsing module, an interface-fetching module, a component-fetching module, a component database and a compiling module.

A method for composing a multi-lingual instructional software according to the invention includes steps of acquiring the user's commands, parsing the requirements, fetching correspondent components and compiling the components and forming the instructional software.

BRIEF DESCRIPTION OF THE DRAWINGS

The invention will become more fully understood from the detailed description given hereinbelow. However, this description is for purposes of illustration only, and thus is not limitative of the invention, wherein:

FIG. 4 is a detailed flowchart of the process of compiling the components in a method of the invention.

DETAILED DESCRIPTION OF THE INVENTION

The invention provides a system and method for compiling a multi-lingual instructional software. The system receives user's commands of a source language and a target language; then, dynamically compiles an instructional software of the requested languages.

Figure 1:
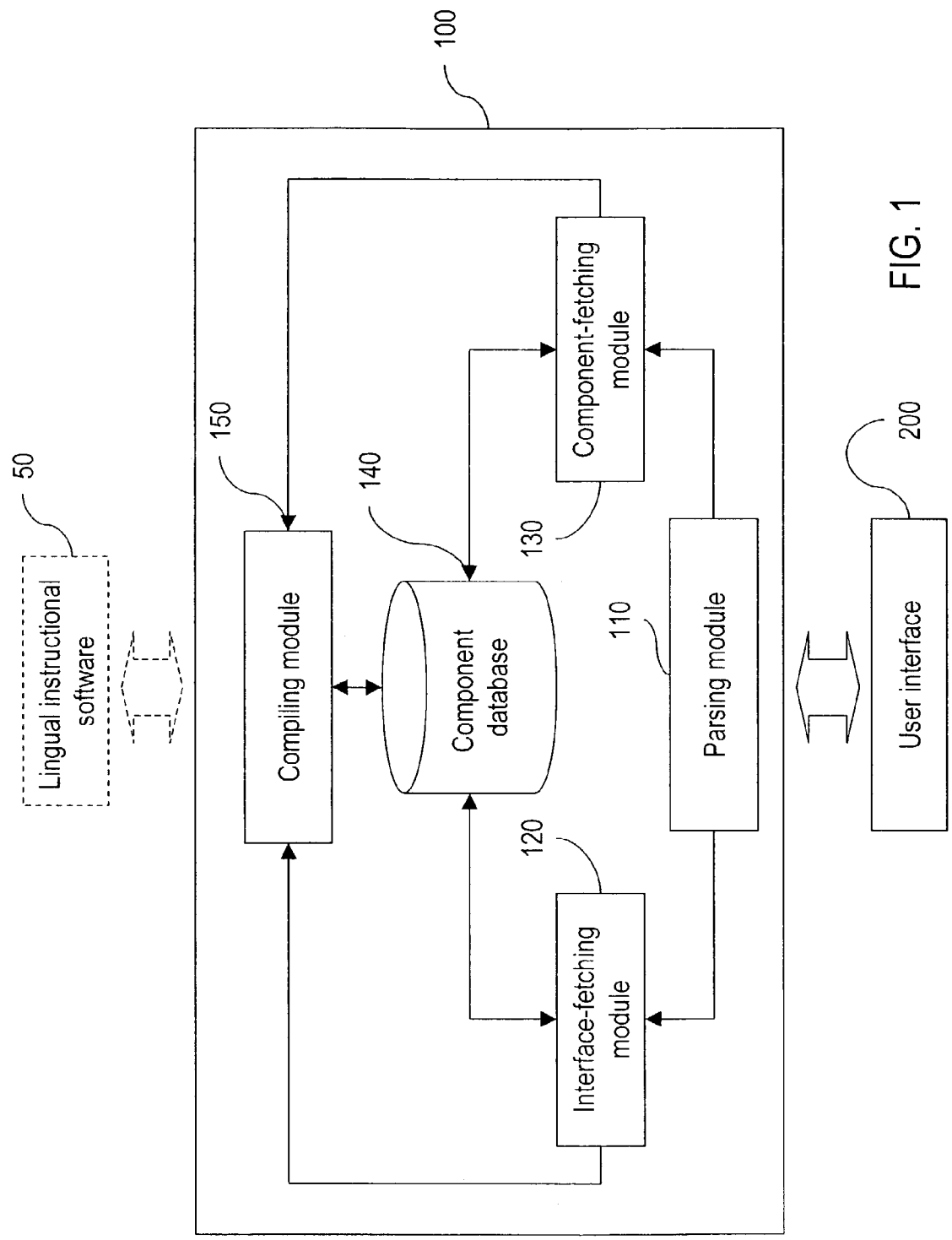
FIG. 1 is a block diagram of a system for composing a multi-lingual instructional software according to the invention.

FIG. 1 shows a block diagram of a system 100 for compiling a multi-lingual instructional software. The system 100 includes a parsing module 110, an interface-fetching module 120, a component-fetching module 130, a component database 140 and a compiling module 150.

The parsing module 110 acquires user's commands through a user interface 200, and parses the requirement commands into a source language code and a target language code that are required by the interface-fetching module 120 and the component-fetching module 130. The source language code and the target language code must be of two different languages. Besides the source language code and the target language code, the requirement commands can further include user information, device information, system information or the like.

The interface-fetching module 120 mainly includes an index of user interface components. The index of user interface components records the codes of each source language, so that, upon receiving user's commands from the parsing module 110, interface components can be fetched from the component database 140 according to a user interface list. Because users usually rely on their familiar language for learning new languages, the invention provides source language selections for users to designate the language of the user interface 200 and makes the learning and operation easier.

The component-fetching module 130 mainly includes an index of lingual components. The index of lingual components records the relative codes of the target language to each lingual components, and the relative codes of the target language to the component codes of exercise banks, so that, upon receiving target language codes from the parsing module 110, a lingual component list and relative component codes of exercise banks can be generated and used to fetch relative components. The lingual components are used to form the core materials of the instructional software 50, such as questions, comparisons and achievement evaluation, etc., besides the user interface 200.

The component database 140 stores the interface components, lingual components and exercise banks required by the interface-fetching module 120, the component-fetching module 130 and the compiling module 150.

The compiling module 150 works like a computer software compiler for compiling and forming the user-designated instructional software by dynamical linking and compiling the interface components and lingual components. When a user operates the instructional software through the user interface 200, the compiling module 150 performs dynamic linkage to the relative exercise banks in the component database 140 according to a linkage setting generated by the operation so as to attain the function of the instructional software 50.

Figure 2:
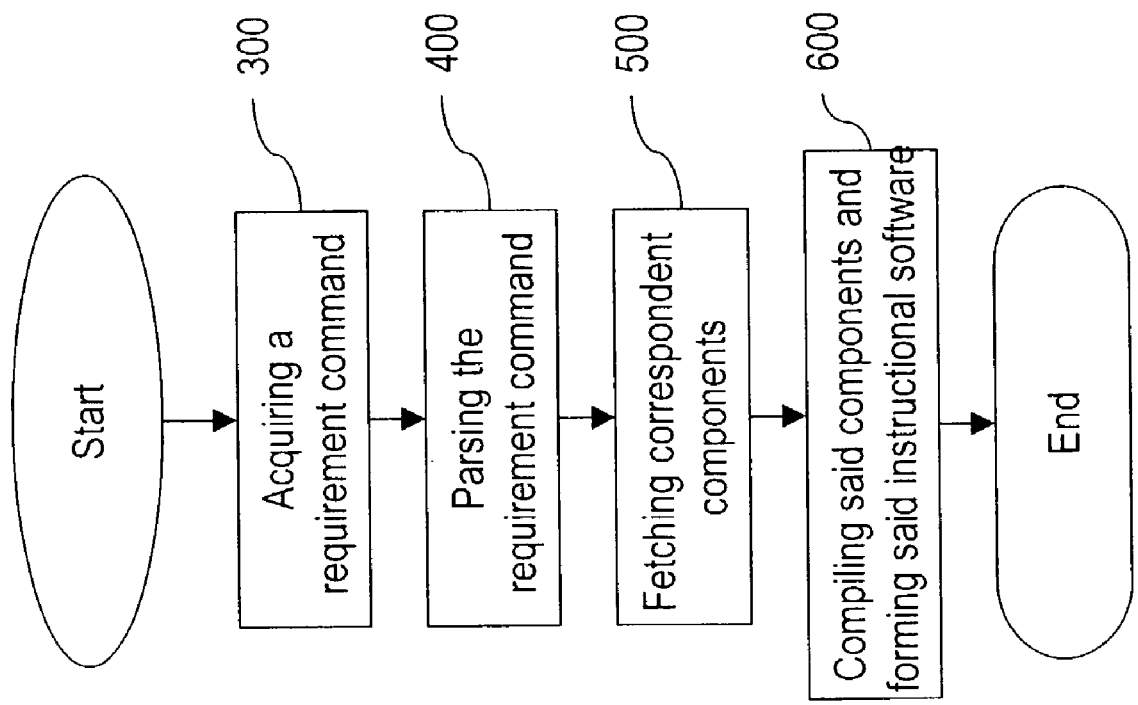
FIG. 2 is a flowchart of a method for composing a multi-lingual instructional software according to the invention.

FIG. 2 is a flowchart of a method for composing a multi-lingual instructional software according to the invention. First, acquiring the user's commands (step 300). The user's commands are inputted through the user interface 200. Then, parsing the user's requirements with the parsing module 110 (step 400). The parsing is to get the code of source language and the code of target language, which are of two different languages. A detailed parsing process is further illustrated with FIG. 3 and will be described later. Then, fetching correspondent components (step 500) with the interface-fetching module 120 and the component-fetching module 130 for obtaining the interface components and lingual components according to the user-designated languages. Finally, compiling the components and forming the instructional software (step 600). The compiling is made by the compiling module 150 that links the interface components and lingual components fetched from the component database 140 and exercise banks. The detailed compiling process is further illustrated in FIG. 4 and will be described later.

Figure 3:
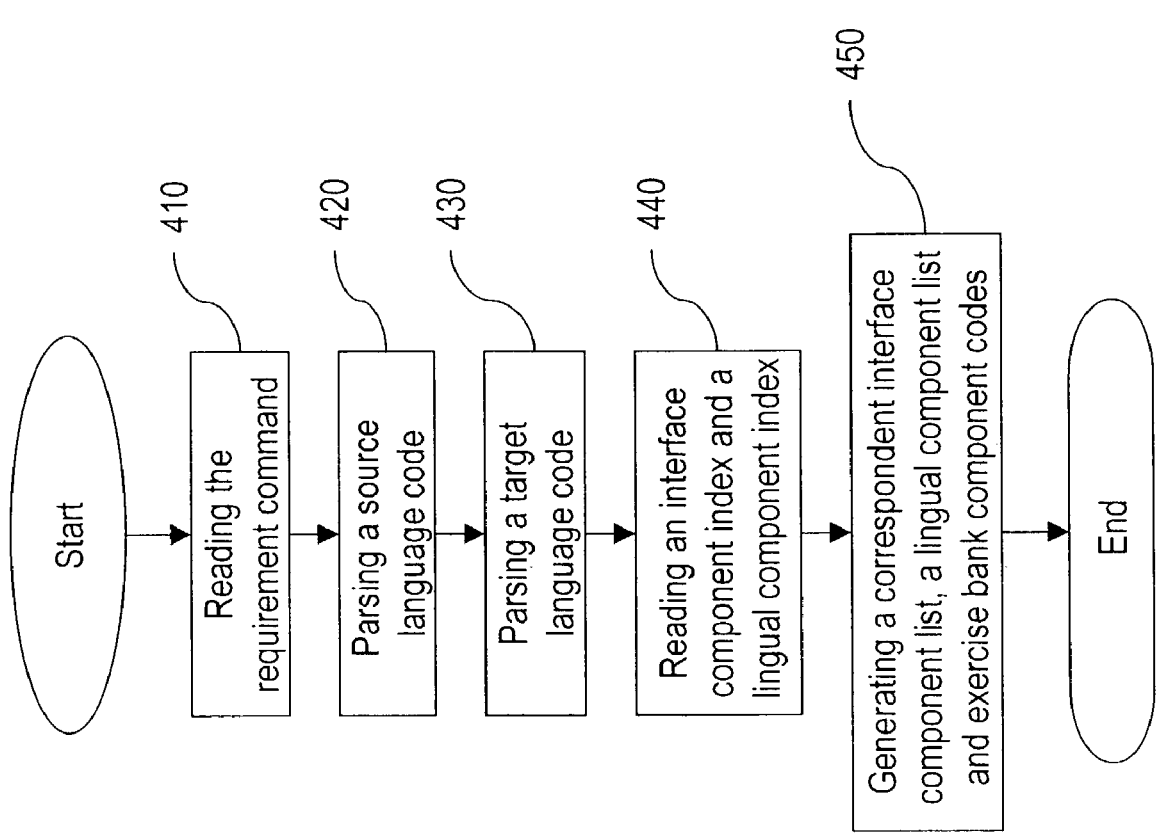
FIG. 3 is a detailed flowchart of the process of paring the requirements in a method of the invention.

FIG. 3 is a detailed flowchart of the process of paring the requirements in a method of the invention. The process includes the following steps. First, reading the parsing requirement (step 410). Then, parsing the source language code (step 420) and parsing the target language code (step 430). Reading the correspondent interface component index and lingual component index with the interface-fetching module 120 and component-fetching module 130 (step 440). Finally, generating correspondent interface component list, lingual component list and exercise bank component codes through a relative index (step 450).

FIG. 4 is a detailed flowchart of the process of compiling the components in a method of the invention. The process includes the following steps. First, receiving the interface components and lingual components (step 610). The interface components are fetched by the interface-fetching module 120. The lingual components are fetched by the component-fetching module 130. Then, linking the interface components (step 620). The step is to link components for the user interface 200. It continues till all the interface components are linked (step 630). Then, linking the lingual components (step 640). The step is to link the rest components relative to the target language in the instructional software 50. It continues till all the lingual components are linked (step 630). Then, dynamically compiling the interface components and lingual components (step 650) to form an executable program. The dynamic compiling continues till all the components are compiled. Then, reading the sentence component codes for setting the linkage to the exercise banks (step 670). The linkage setting is used for dynamic linkage to the component database 140 and fetching the exercise banks when the instructional software 50 is operated. The linkage setting continues till the instructional software is finished (step 680).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer system, based on user's requirement, for composing a multi-lingual instructional software through dynamic linkage and compiling of interface and lingual components, the computer system comprising:

a user interface for users to input a requirement command and operate an instructional software;

a parsing module for receiving the requirement command, parsing said requirement command and generating a source language code and a target language code that are required by an interface-fetching module and a component-fetching module, and the parsing module acquires user's commands through the user interface, wherein the source language code and the target language code, the requirement command further include user information, device information, system information, said requirement command comprising at least a source language code and a target language code, said source language code and said target language code being of two different languages;

the interface-fetching module for storing an interface component index, generating an interface component list correspondent to said source language code, fetching relative interface components according to said interface component list, and the interface component index of users records the codes of each source language, so that, upon receiving user's commands from the parsing module, a interface component can be fetched from a component database according to the interface component list of users wherein users usually rely on their mother language for learning new languages, the computer system provides source language selections for users to designate the language of an user interface, said interface component index records said source language code and the relative interface component codes;

the component-fetching module for storing a lingual component index, generating a lingual component list and exercise bank component codes correspondent to said target language code, fetching relative lingual components according to said lingual component list, wherein the index of lingual components records relative codes of the target language to each lingual components, and the relative codes of the target language to the component codes of exercise banks, so that, upon receiving target language codes from the parsing module, said lingual component list and relative component codes of exercise banks can be generated and used to fetch relative components, said lingual component index records said target language code and the relative target component codes and the exercise bank component codes;

the component database for storing a plurality of interface components, a plurality of lingual components and a plurality of exercise banks required by the interface-fetching module, the component-fetching module and a compiling module; and the compiling module for dynamic linkage and compiling of said interface components and lingual components, performing a linkage setting of said exercise banks according to said exercise bank component codes, and forming said instructional software wherein the compiling module works for compiling and forming the said instructional software by dynamical linking and compiling the interface components and lingual components, when the users operate the instructional software through the user interface, the compiling module performs dynamic linkage to the relative exercise banks in the component database according to a linkage setting generated by the operation so as to attain the function of the instructional software, said linkage setting is to fetch the relative exercise banks from said component database through the dynamic linkage when said instructional software is executed.

* * * * *